US007519456B2

(12) United States Patent
Pomies et al.

(10) Patent No.: US 7,519,456 B2
(45) Date of Patent: Apr. 14, 2009

(54) MAINTENANCE PROCESS AND DEVICE FOR A RADIONAVIGATION INSTALLATION OF AN AIRCRAFT

(75) Inventors: Dominique Pomies, Toulouse (FR); Gilles Tatham, La Salvetat Saint Gilles (FR)

(73) Assignee: AIRBUS France, Toulouse (FR)

( * ) Notice: Subject to any disclaimer, the term of this patent is extended or adjusted under 35 U.S.C. 154(b) by 881 days.

(21) Appl. No.: 10/933,500

(22) Filed: Sep. 3, 2004

(65) Prior Publication Data

US 2006/0293803 A1 Dec. 28, 2006

(30) Foreign Application Priority Data

Sep. 5, 2003 (FR) .................................. 03 10497

(51) Int. Cl.
*G01C 23/00* (2006.01)
*G01M 17/00* (2006.01)

(52) U.S. Cl. ................... 701/3; 701/29; 701/9; 701/79; 701/200; 701/213; 701/214; 342/357.02; 342/357.12; 714/45; 714/46; 714/47

(58) Field of Classification Search . 342/357.2–357.12; 701/29, 213, 200, 214, 9, 79; 714/45–47
See application file for complete search history.

(56) References Cited

U.S. PATENT DOCUMENTS 4,729,102 A * 3/1988 Miller et al. .................. 701/14
4,943,919 A * 7/1990 Aslin et al. .................... 701/3
5,216,611 A * 6/1993 McElreath .................. 701/221
5,561,686 A * 10/1996 Kobayashi et al. .......... 375/134
5,764,886 A * 6/1998 Danielson et al. ............. 714/47
5,957,995 A * 9/1999 Beckmann et al. .......... 701/213
5,974,349 A * 10/1999 Levine ........................ 701/29
6,115,654 A * 9/2000 Eid et al. ...................... 701/34
6,115,656 A * 9/2000 Sudolsky ..................... 701/35
6,313,786 B1 * 11/2001 Sheynblat et al. ...... 342/357.02
6,324,592 B1 * 11/2001 Hindman ....................... 710/3
6,459,967 B1 * 10/2002 Otto ........................... 701/129
6,553,336 B1 * 4/2003 Johnson et al. ............. 702/188
6,598,179 B1 * 7/2003 Chirashnya et al. ........... 714/37
6,606,559 B1 * 8/2003 Beckmann et al. .......... 701/213
6,693,558 B2 * 2/2004 Hedrick ....................... 340/971
6,859,695 B2 * 2/2005 Klausner ..................... 701/29
2003/0083794 A1 * 5/2003 Halm et al. ................... 701/29
2003/0144775 A1 * 7/2003 Klausner ..................... 701/29
2005/0149238 A1 * 7/2005 Stefani et al. ................. 701/33
2006/0069468 A1 * 3/2006 Astruc ........................... 701/3
2006/0200587 A1 * 9/2006 Hindman ....................... 710/3
2006/0293803 A1 * 12/2006 Pomies et al. .................. 701/3

FOREIGN PATENT DOCUMENTS

WO 0197038 12/2001

* cited by examiner

*Primary Examiner*—Thomas G Black
*Assistant Examiner*—Wae Louie
(74) *Attorney, Agent, or Firm*—Dickinson Wright, PLLC

(57) ABSTRACT

Maintenance process and device for a radionavigation installation of an aircraft.

Figure 1:
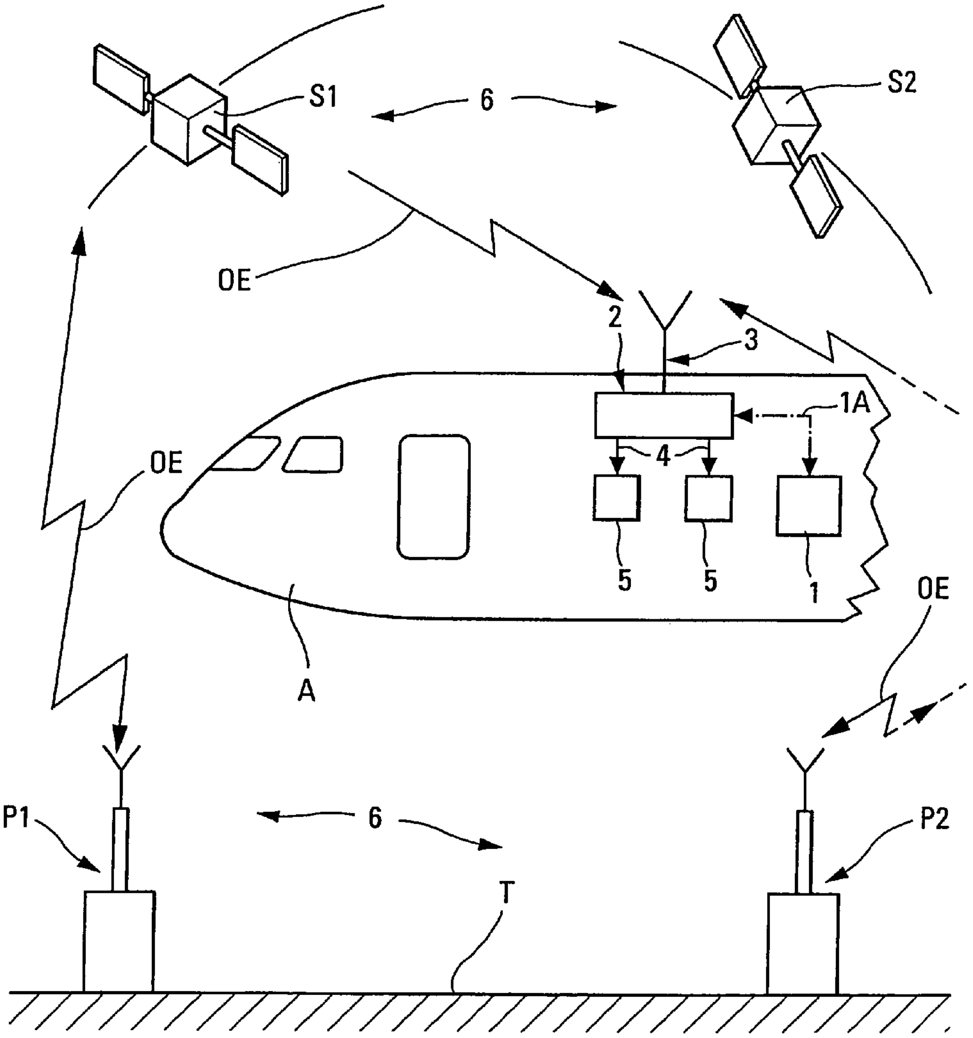

The maintenance device (1) comprises a first means of recording (7) for recording on a first recording medium (8) first events relating to data external to the aircraft, received by said radionavigation installation (2), a second means of recording (10) for recording on a second recording medium (11) second events relating to malfunctions occurring on board the aircraft, and means (13) for making it possible to analyze said first and second events recorded on said first and second recording media (8, 11), so as to determine whether said radionavigation installation (2) should or should not be disassembled.

10 Claims, 2 Drawing Sheets

MAINTENANCE PROCESS AND DEVICE FOR A RADIONAVIGATION INSTALLATION OF AN AIRCRAFT

The present invention relates to a maintenance process and device for a radionavigation installation of an aircraft, in particular of a transport airplane.

It is known that a radionavigation installation of an aircraft, such as a distance measuring apparatus of DME ("Distance Measuring Equipment") type, a VHF ("Very High Frequency") omnidirectional radiobeacon, a locating system of GPS ("Global Positioning System") type or a landing aid device of GLS ("GPS Landing System") type for example, receives data that are external to the aircraft and calculates information, in particular information relating to the position of the aircraft, on the basis of said external data. It generally supplies this information to other systems of the aircraft, in particular systems for guidance or for display of the position of the aircraft. When a malfunction arises on board the aircraft, the origin of which is identified as stemming from said information which is supplied by said radionavigation installation to other systems of the aircraft, the maintenance procedures provide that said radionavigation installation should be disassembled and sent to a repairer so as to be checked and repaired there if necessary.

Now, the information supplied by the radionavigation installation may be erroneous, not only by reason of a failure of said radionavigation installation, but also by reason of a problem relating to said external data received by said radionavigation installation. In the latter case, the usual maintenance procedures turn out to be unnecessarily lengthy and expensive, since the radionavigation installation is disassembled and sent for repair, although it is not faulty, since said malfunction occurring on board the aircraft is due to said data external to the aircraft.

An object of the present invention is to remedy these drawbacks. It relates to a maintenance process for a radionavigation installation of an aircraft, making it possible to reduce the number of cases for which said radionavigation installation has to be disassembled for verification and possible repair when it is suspected that a malfunction occurring on board the aircraft originates from this installation.

For this purpose, said process is noteworthy, according to the invention, in that:

a) first events relating to data external to the aircraft, received by said radionavigation installation, are recorded in a first list, as appropriate;
b) second events relating to malfunctions occurring on board the aircraft are recorded in a second list, as appropriate;
c) a check is carried out to verify whether said second list comprises at least one second event relating to a malfunction, and:
    - c1) if said second list comprises no second event, said radionavigation installation is not disassembled; and
    - c2) if said second list comprises at least one second event relating to a malfunction, then all the second events of said second list are analyzed, and:
        - α) if none of said second events relates to said radionavigation installation, then said radionavigation installation is not disassembled; and
        - β) if at least one of said second events relates to said radionavigation installation, then all the first events of said first list are analyzed, and:
            - β1) if said first events make it possible to prove that the various malfunctions are due to problems relating to said data external to the aircraft, then said radionavigation installation is not disassembled;

- β2) otherwise, said radionavigation installation is disassembled.

Thus, by virtue of the invention, said radionavigation installation is disassembled so as to be sent for repair, only if said first events recorded do not make it possible to prove that said malfunction is due to a problem relating to the data external to the aircraft received by said radionavigation installation, thus making it possible of course to considerably reduce the number of unnecessary disassemblies, and hence, to decrease the cost and the duration of maintenance.

Preferably, said steps a) and b) are implemented during the flight of the aircraft and said step c) is implemented at the end of said flight, after the aircraft has returned to the ground.

Furthermore, advantageously, said first events are recorded on a recording medium of said radionavigation installation, and said second events are recorded on a recording medium of a system of the aircraft, which receives information from said radionavigation installation.

In a particular embodiment, said radionavigation installation is a landing aid device of the aircraft combined with a positioning system based on satellites and said first events recorded represent the situations for which the external data received by said landing aid device do not make it possible to supply a correct position indication of the aircraft.

In this case, preferably, said first events represent at least the following situations:

- the number of satellites, from which the radionavigation installation receives data, is insufficient to compute a position of the aircraft;
- the level of the radiofrequency signals received by said radionavigation installation is below a predetermined value;
- anomalies exist in navigation messages transmitted by a satellite of said positioning system;
- a satellite of said positioning system is excluded by a ground station of said positioning system;
- corrections supplied by a ground station of said positioning system are too old for a satellite of said positioning system;
- a ground station of said positioning system is not operational;
- there exists a problem with the integrity of data supplied by a ground station of said positioning system;
- there exists a loss of a signal received from a ground station of said positioning system;
- there exists an error of transmission of a signal received from a ground station of said positioning system; and
- there exists a loss of a predetermined level of protection.

The present invention also relates to a maintenance device for an aircraft.

According to the invention, said device is noteworthy in that it comprises:

- a first means of recording for recording on a first recording medium first events relating to data external to the aircraft, received by said radionavigation installation;
- a second means of recording for recording on a second recording medium second events relating to malfunctions occurring on board the aircraft; and
- means for making it possible to analyze said first and second events recorded on said first and second recording media, so as to determine whether said radionavigation installation should or should not be disassembled.

In a particular embodiment:

- said first means of recording is a means of recording of said radionavigation installation; and/or said second means of recording is a means of recording of a system of the aircraft, which receives information from said radionavigation installation.

The figures of the appended drawing will elucidate the manner in which the invention may be embodied. In these figures, identical references designate similar elements.

FIG. 1 diagrammatically illustrates a radionavigation installation of an aircraft, to which a maintenance device in accordance with the invention is applied.

Figure 2:
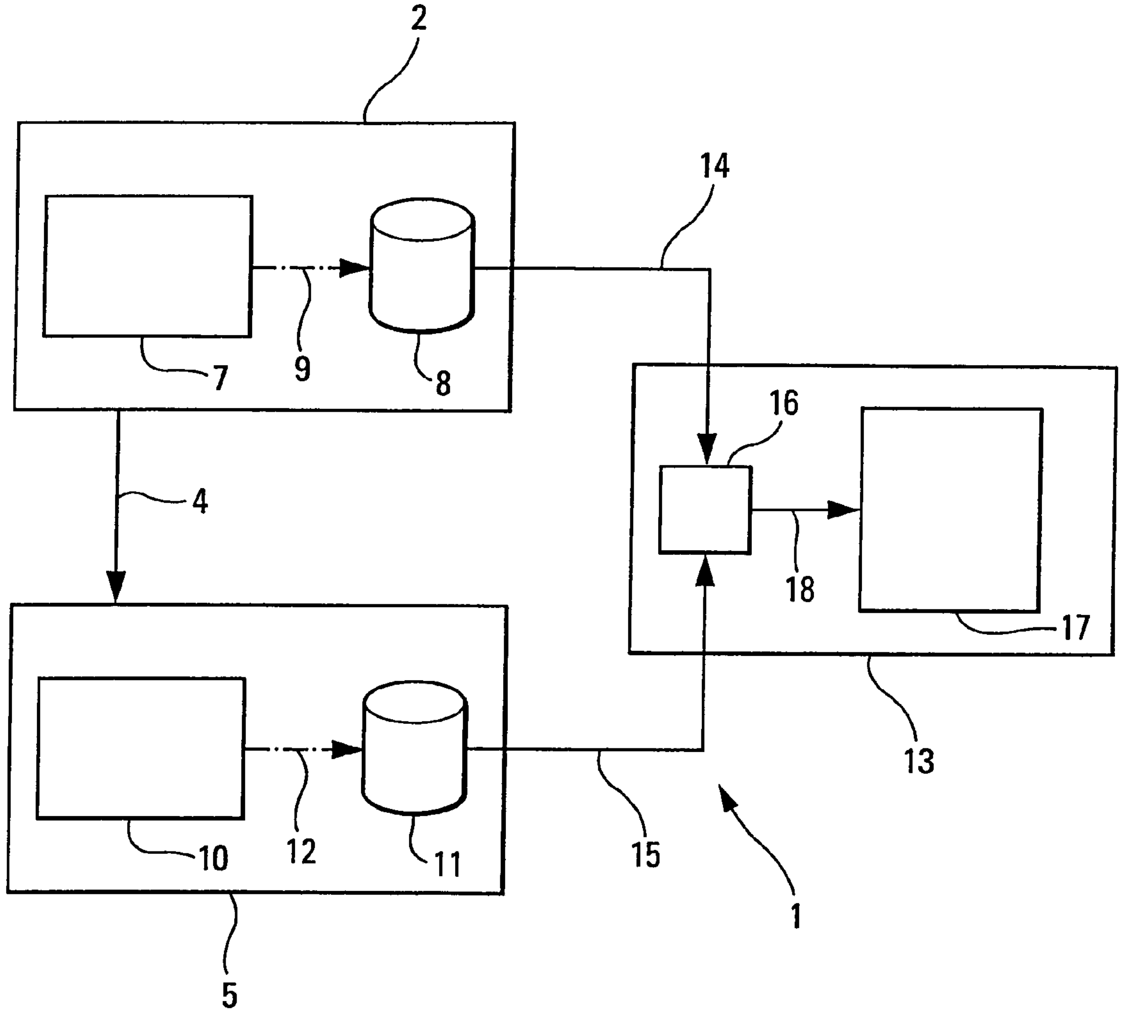

FIG. 2 is the schematic diagram of a maintenance device in accordance with the invention.

The device 1 in accordance with the invention is intended for the maintenance of a radionavigation installation 2 of an aircraft A, in particular of a civil transport airplane.

Said radionavigation installation 2 may, in particular, be a distance measuring apparatus of DME ("Distance Measuring Equipment") type, a VHF ("Very High Frequency") omnidirectional radio beacon, a locating system of GPS ("Global Positioning System") type or a landing aid system of GLS ("GPS Landing System") type.

As may be seen in FIG. 1, said radionavigation installation 2, of usual type, which is disposed on board the aircraft A, is able to receive external data from outside the aircraft A, in particular in the form of electromagnetic waves OE, with the aid for example of an antenna 3. On the basis of these external data it calculates information, for example position information or indications, that it transmits, by way of links 4, to user systems 5 of the aircraft A, in particular guidance systems or display systems.

In a preferred embodiment, said radionavigation installation 2 is a landing aid device of the aircraft A of GLS type, which is combined with a positioning system 6.

This positioning system 6 comprises a set of satellites S1, S2 and/or of ground stations P1, P2 which are provided on land T. These satellites S1, S2 and these ground stations P1, P2 can communicate with one another, and with said radionavigation installation 2, with the aid of electromagnetic waves OE.

The maintenance device 1 is associated with said radionavigation installation 2, as represented in a general manner by a link 1A shown chain dotted in FIG. 1, and as specified hereinbelow, and its aim is to make it possible to reduce the number of cases for which said radionavigation installation 2 has to be disassembled for verification and possible repair when it is suspected that a malfunction occurring on board the aircraft A originates from this installation 2.

To do this, said device 1 comprises, as represented in FIG. 2:

- a usual means of recording 7 for recording on a recording medium 8, as illustrated by a link 9 shown chain dotted, in a first list, first events relating to data external to the aircraft A, received by said radionavigation installation 2;
- a usual means of recording 10 for recording on a recording medium 11, as illustrated by a link 12 shown chain dotted, in a second list, second events relating to malfunctions occurring on board the aircraft A; and
- a central unit 13 which is connected by links 14 and 15 respectively to said recording media 8 and 11, so as to make it possible to analyze said first and second events recorded on said recording media 8 and 11, so as to determine whether said radionavigation installation 2 does or does not have to be disassembled.

To do this, according to the invention, a check is carried out to verify whether said second list comprises at least one second event, and:

- if said second list comprises no second event, said radionavigation installation 2 is not disassembled; and
- if it comprises at least one second event relating to a malfunction, then all the second events of said second list are analyzed, and:
  - α) if none of said second events relates to said radionavigation installation 2, then this radionavigation installation 2 is not disassembled; and
  - β) if at least one of said second events relates to said radionavigation installation 2, then all the first events of said first list are analyzed, and:
    - β1) if said first events make it possible to prove that the malfunction(s) which occurred on board the aircraft A are due to problems relating to said data external to the aircraft A, then said radionavigation installation 2 is not disassembled;
    - β2) otherwise (if such proof is not possible), said radionavigation installation 2 is disassembled.

Said central unit 13 comprises a means 16 and a display screen 17 which is connected by a link 18 to said means 16.

In a first embodiment, said means 16 is an information acquisition unit which receives said first and second lists and displays them on the display screen 17. In this case, the above analysis or verification is implemented by a maintenance operator, upon reading said two lists which are presented to him on the display screen 17.

In a second embodiment, said means 16 is an information processing unit, which automatically implements the above analysis or verification, on the basis of said two lists received, and which presents the result of this analysis (disassembly or not of the radionavigation installation 2) to a maintenance operator by displaying it on the display screen 17.

Preferably, the aforesaid recording of the first and second events is carried out during the flight of the aircraft A, and the analysis or verification of said recordings is carried out later, after this aircraft A has returned to the ground.

By virtue of the invention, said maintenance device 1 exhibits the advantage of doing away with the need to disassemble (and send for repair) a radionavigation installation 2, when this installation 2 has not been able to supply valid information to other systems 5 of the aircraft A, although the origin of the fact that it has not been able to supply this information was not attributable to it, but was attributable to causes external to the aircraft A. This maintenance device 1 is therefore very advantageous in terms of duration and cost of maintenance.

In the aforesaid preferred embodiment relating to a landing aid device of GLS type, the radionavigation installation 2 implements a complex function, since it uses external data originating from a space segment (RF radiofrequency signals transmitted by GPS satellites, for example the satellites S1 and S2) and from a ground segment (link for VHF data transmitted by differential GPS ground stations, for example the ground stations P1 and P2).

The RF signals and the VHF data are grouped together, in FIG. 1, under the reference OE designating in a general manner electromagnetic waves.

In this case, said first events recorded represent the situations for which the external data received by said landing aid device 2 do not make it possible to supply a correct position indication of the aircraft A.

These first events are, in particular, the following:

- number of "GPS" satellites S1 and S2 (from which the radionavigation installation 2 receives data) insufficient to compute a position of the aircraft A:

level of the radiofrequency signals (received from a satellite S1, S2) below a value short of which the radionavigation installation 2 cannot utilize said signals;

anomalies in the navigation messages transmitted by a satellite S1, S2;

satellite S1, S2 excluded by a ground station P1, P2 (when the ground station P1, P2 determines that the data received from this satellite S1, S2 are not reliable);

corrections supplied by a ground station P1, P2 are too old for a satellite S1, S2;

information relating to a ground station P1, P2:

ground station P1, P2 not operational (station under maintenance, invalidation of approach);

problem with the integrity of the data supplied by the ground station P1, P2;

loss of the signal received from a ground station P1, P2 (level of the signal received below a predetermined value or radiofrequency anomaly);

error of transmission of the signal received from a ground station (P1, P2); and loss of the levels of protection: the GLS installation computes a "sphere of confidence" around the GLS position computed. If the radius of this sphere of confidence exceeds a threshold (called the "limit alarm"), information supplied by the GLS installation to systems 5 of the aircraft A are invalidated. The value of this threshold can be sent to the aircraft A by a ground station P1, P2. It can also be a predetermined value.

The invention claimed is:

1. A maintenance process for a radionavigation installation of an aircraft, said process comprising:

a) recording in a first list, as appropriate, first events relating to data external to the aircraft, received by said radionavigation installation;

b) recording in a second list, as appropriate, second events relating to malfunctions occurring on board the aircraft;

c) performing a check to verify whether said second list comprises at least one second event relating to a malfunction, and:

c1) if said second list comprises no second event, refraining from disassembling said radionavigation installation; and c2) if said second list comprises at least one second event relating to a malfunction, analyzing all the second events of said second list, and:

α) if none of said second events relates to said radionavigation installation, refraining from disassembling said radionavigation installation; and β) if at least one of said second events relates to said radionavigation installation, analyzing all the first events of said first list, and:

β1) if said first events make it possible to prove that the various malfunctions are due to problems relating to said external radionavigation data, refraining from disassembling said radionavigation installation;

β2) otherwise, disassembling said radionavigation installation.

2. The process as claimed in claim 1, wherein said steps a) and b) are implemented during a flight of the aircraft and said step c) is implemented at the end of said flight, after the aircraft has returned to the ground.

3. The process as claimed in claim 1, wherein said first events are recorded on a recording medium of said radionavigation installation, and wherein said second events are recorded on a recording medium of a system of the aircraft, which receives information from said radionavigation installation.

4. The process as claimed in claim 1, wherein said radionavigation installation is a landing aid device of the aircraft combined with a positioning system based on satellites and wherein said first events recorded represent situations for which the external data received by said landing aid device do not make it possible to supply a correct position indication of the aircraft.

5. The process as claimed in claim 4, wherein said first events represent at least the following situations:

a number of the satellites from which the radionavigation installation receives data, is insufficient to compute a position of the aircraft;

a level of the radiofrequency signals received by said radionavigation installation is below a predetermined value;

anomalies exist in navigation messages transmitted by a satellite of said positioning system;

a satellite of said positioning system is excluded by a ground station of said positioning system;

corrections supplied by a ground station of said positioning system are too old for a satellite of said positioning system;

a ground station of said positioning system is not operational;

there exists a problem with the integrity of data supplied by a ground station of said positioning system;

there exists a loss of a signal received from a ground station of said positioning system;

there exists an error of transmission of a signal received from a ground station of said positioning system; and there exists a loss of a predetermined level of protection.

6. A maintenance device for a radionavigation installation of an aircraft, which device comprises:

a first recordation section that records on a first recording medium a first list of first events relating to data external to the aircraft, received by said radionavigation installation;

a second recordation section that records on a second recording medium a second list of second events relating to malfunctions occurring on board the aircraft; and a section that enables analysis of said first and second events recorded on said first and second recording media, so as to determine whether said radionavigation installation should or should not be disassembled, wherein:

if said second list comprises no second event, said radionavigation installation is not disassembled; and if said second list comprises at least one second event relating to a malfunction, then all the second events of said second list are analyzed, and:

if none of said second events relates to said radionavigation installation, then said radionavigation installation is not disassembled; and if at least one of said second events relates to said radionavigafion installation, then all the first events of said first list are analyzed, and:

if said first events make it possible to prove that the various malfunctions are due to problems relating to said external radionavigation data, then said radionavigation installation is not disassembled; and otherwise, said radionavigation installation is disassembled.

7. The device as claimed in claim 6, wherein said first recordation section records said radionavigation installation.

8. The device as claimed in claim 6, wherein said second recordation section records a system of the aircraft, which receives information from said radionavigation installation.

9. An aircraft, which comprises a device such as that as specified under claim 6.

10. An aircraft, which comprises a device able to implement the process specified under claim 1.

* * * * *